United States Patent Office 3,803,095
Patented Apr. 9, 1974

3,803,095
WATER AND TOLUENE SOLUBLE METHYLATED METHYLOLUREA RESIN AND PROCESS FOR THE PREPARATION THEREOF
Leonard Joseph Calbo, Jr., Hartsdale, N.Y., and Jerry Norman Koral, Stamford, Conn., assignors to American Cyanamid Company, Stamford, Conn.
No Drawing. Continuation-in-part of abandoned application Ser. No. 72,523, Sept. 15, 1970. This application Aug. 17, 1972, Ser. No. 281,355
Int. Cl. C08g 9/10, 9/34
U.S. Cl. 260—70 A                  13 Claims

ABSTRACT OF THE DISCLOSURE

Methylated urea formaldehyde resins are disclosed wherein the weight of the methoxyl substituents is 28%–40% of the weight of the resin and the molar ratio of the reacted formaldehyde therein to the methoxyl substituents is such that the resin possesses substantial solubility both in water and in toluene. The resin is made by a double alkylation process.

---

This is a continuation-in-part of our copending application Ser. No. 72,523, filed on Sept. 15, 1970, now abandoned.

The present invention relates to thermosetting methylated urea-formaldehyde resins which are soluble both in water and in toluene. The invention includes processes for the manufacture of such resins.

Thermosetting methylated dimethylolurea resins have long been known (cf. Hurwitz U.S. Pat. No. 2,750,356), and are widely used as textile finishes. Such resins are typically made by refluxing a reaction mixture composed of 2 to 4 mols of formaldehyde, 2 to 6 mols of methanol and 1 mol of urea at an alkaline pH until substantially all of the urea has been converted to a polymethylolurea, continuing the refluxing at an acid pH until the polymethylolurea has become methylated, and then cooling and neutralizing the resulting resin. The methoxyl content of such resins is in the range of 20%–25% by weight, and they are not soluble in toluene or in anhydrous organic coating compositions, so that their field of use has been limited.

The discovery has now been made that resins of the foregoing type at room temperature are soluble in water in all proportions and dissolve at least 50% of their weight of toluene when they have a methoxyl content (i.e., a content of CH₃O— substituents) in the range of 28% to 40% by weight. The resins thus are useful both in the manufacture of water-based and oil-based coating compositions.

We have further found that resins of this high methoxyl content can be produced when the prior art procedure is modified in two respects as follows:

The first modification is the performance of the alkaline refluxing step at a pH within the range of 7.5–11.5 and terminating the step as soon as a clear and homogeneous mixture is obtained. This occurs when the urea has reacted with sufficient of the formaldehyde to form a water-soluble methylolurea.

The second modification is the performance of the acid reaction in two different pH ranges and at two different temperatures. The first step is performed at a pH in the range of 4.5 to 5.5 and at reflux temperature until the rate of methylation of the polymethylolurea has become very slow or has substantially ceased. In the second step, the essentially monomeric methylated methylolurea thus obtained is cooled to 20° C.–40° C. and is maintained at pH 2–3, preferably, but not necessarily, in the substantial absence of water until the material has condensed to a low polymeric state. The reaction is terminated by adjusting the pH to about 7–10 when a sample of the material, diluted to 80% solids with isopropyl alcohol, dissolves in water and in butanol at 25° C.

The resulting resinous syrup is then heated under vacuum to strip off any volatiles present (water, formaldehyde, methanol, etc.). The residue is a water-clear substantially anhydrous thermosetting methylated urea-formaldehyde resin consisting essentially of reacted urea, formaldehyde and methanol. The resin is prepared in low polymeric form as it loses water-solubility and gains viscosity with increasing molecular weight. The resin substantially in the dimeric-tetrameric range is preferred as in this range the resin shows little or no tendency to crystallize on storage, possesses excellent solubility properties, and possesses a desirably low viscosity.

The structural formula of the resin has not been determined. However, the resin consists essentially of

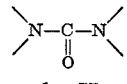

units, —CH₂— bridges and —H, —CH₂OH,
—CH₂OCH₃ substitutents. As is shown below, a minor proportion of the —CH₃ substituents may be the radicals of lower water-soluble alcohols (ethyl, n-propyl, n-butyl, etc.) and even substantially water-insoluble alcohols (e.g. 1-hexyl) without altering the essential character of the resin. The C₂–C₆ alkanols provide resins of good oil solubility and are therefore preferred.

In the process, the formaldeyde employed may be paraformaldehyde or aqueous formaldehyde. When paraformaldehyde is employed, the first reaction at acid pH may follow the alkaline reaction directly (i.e., without an intervening distillation). When aqueous formaldehyde is used, substantially all the water present should be distilled off after the alkaline reaction has been completed and before the acid reaction is begun. A product of better solubility in toluene is generally obtained when all the water is distilled, but in practice distillation of 85% to 90% of the water gives a satisfactory product and is therefore preferred.

The first three pH ranges are critical, and the benefits of the present invention are not attained when a substantial departure therefrom is made.

When less than about 2 mols of formaldehyde is added per mol of urea, the ultimate resin is not compatible with oil finishes. When more than about 4 mols of formaldehyde are added per mol of urea, the product tends to gel prematurely. When less than about 2 mols of methanol is added, the product likewise tends to be incompatible, and when more than about 6 mols are taken, the product tends to crystallize.

Preferably, the starting mixture is composed of about 3 mols of formaldehyde and 3 mols of methanol per mol of urea.

In general, the resin is adequately soluble in water and in toluene when it contains a sufficient proportion of combined formaldehyde so that it is thermosetting (i.e., when it becomes water-insoluble and infusible when baked as a film at 105° C. at an acid pH) and when it contains methoxyl substituents in the range of 28% to 40% by weight. It is this high proportion of methoxyl substituents (alone or in combination with similar C₂–C₆ alkyl substituents) which renders the resin compatible with oil-based film-forming compositions without decreasing the solubility of the resin in water.

The resin possesses very satisfactory all-around water- and oil-solubility, coupled with desirably low viscosity, when it is composed of inter-reacted urea, formaldehyde and methanol in the following molar proportions and when the molar ratio of the combined formaldehyde to the methoxyl substituents is as shown below. The preferred range (which appears to provide best solubility characteristics) is shown in brackets.

| Range | Mols | | | Molar ratio $CH_2O$: $CH_3O-$ | |
|---|---|---|---|---|---|
| | Urea | $CH_2O$ | $CH_3OH$ | Broad | Preferred |
| Lower | 1 | 2.2 | 1.3 | 1.10 | 1.70 |
| Upper | 1 | 2.8 | 2.0 | 2.15 | 1.40 |
| [Preferred | 1 | 2.4 | 1.5 | --------- | 1.60] |

In the table, the broad values in the "molar ratio" column were determined by dividing the lower $CH_2O$ value with the upper $CH_3OH$ value, and by dividing the upper $CH_2O$ value with the lower $CH_3OH$ value. The preferred values were obtained by dividing the lower $CH_2O$ value with the lower $CH_3OH$ value, etc. The last horizontal line of the table indicates the values between upper and lower ranges which appear to give over-all best results.

The values shown in the table above and the requirement that the resin contain 28% to 40% methoxyl substituents by weight represent mutually dependent variables. In each instance, the proportion of methoxyl substituents should be a value in the 28%–40% range which provides good toluene solubility without causing water-insolubility, and the proportion of hydroxymethyl substituents should be such that the resin possesses good water-solubility without causing toluene-insolubility.

The preferred resin is stable as prepared for several weeks at room temperature, is soluble in all proportions in water, and dissolves toluene to the extent of 50% of its weight.

When the resin does not substantially fall within the foregoing ranges, the resin is not readily soluble in water and toluene (and in other polar and non-polar liquids). The resin defined by these ranges is commercially useful because it can be used as cross-linking agent both in water-based (including latex type) and in organic solvent-based coatings (paints, lacquers, and paper and textile finishes). It thus permits a decrease in the inventory of raw materials needed for the formulation of these coatings.

For the downward pH adjustments, any water-soluble acid can be used. However, formic and nitric acids are preferred for the respective adjustments because the precipitates which they form are easily removed by filtration.

The product is a fast-reacting cross-linking agent when incorporated in thermosetting alkyd resin formulations and baked. Moreover, the resin produces a superior hardening effect, 10% of the resin (based on the weight of a typical thermosetting short oil alkyd resin) imparting a hardness which heretofore has required approximately twice this amount of a conventional butylated urea resin.

Substantially the same results are obtained when the methanol referred to in the present invention is replaced by ethanol.

We have found that replacement of a small part of the methoxy substituents with butoxy, propoxy and higher substituents in the $C_2-C_6$ range improves the solubility of the resin in toluene and in xylene and in organic solvent-based alkyd resin coating composition without significantly decreasing the solubility of the resin in water. Thus, when 20 mol percent of the methoxyl substituents are replaced by butoxy, the resin is soluble in an equal weight of water at room temperature and dissolves exceptionally well in toluene and xylene. The amount of exchange needed in any instance to accomplish this result depends chiefly on the particular alcohols (or mixture of alcohols) added and on the molecular weight of the resin, and is most conveniently found by laboratory trial, but in general 0.5 mol of one or more $C_2-C_6$ alkoxy substituent per urea residue is advantageous.

When it is desired to incorporate a higher alcohol into the resin, best results are obtained when the desired higher alcohol (i.e., propanol, butanol, etc.) is added to the reaction mixture after the water and unreacted methanol (or ethanol) has been distilled off at the conclusion of the first acid reaction and before the start of the second acid reaction, so that an ether exchange occurs during the second acid reaction. The higher alcohol may be conveniently added in excess to the reaction mixture and the excess distilled off once the desired amount of ether exchange has been accomplished.

The alcohols used in this step need not be those which are soluble in all proportions in water. The term "water-soluble alcohols" as used herein includes those which dissolve to the extent of 5% by weight in water at 25° C.

The invention is further illustrated by the examples which follow. These examples are best embodiments of the invention and are not to be construed in limitation thereof.

EXAMPLE 1

The following illustrates the manufacture of a stable, water- and butanol-soluble methylated urea-formaldehyde resin according to the present invention which possesses fast cross-linking properties with short-oil alkyd resin.

To a two-liter three-necked flask equipped with stirrer, condenser and thermometer is charged 288 g. (9 mols) of methanol, 297 g. (9 mols) of 91% paraformaldehyde, and a sufficient amount of triethanolamine to adjust the pH to 9–10. The temperature is raised to 50° C., 180 g. (3 mols) of urea is added over 20 minutes, and the mixture is heated to reflux (81° C.). Refluxing is continued until the mixture is clear and homogeneous (25–30 minutes). The mixture is cooled to 75° C. and to it is added over 7 minutes (to prevent excessive exotherm) enough 90% aqueous formic acid to reduce the pH to 4.5–5.5. The mixture is then brought to reflux (about 84° C.) and refluxing is continued until the rate of reaction of the methanol with the urea-formaldehyde reaction product has become negligibly slow (usually about 3 hours). The mixture is then allowed to cool to 25° C. and 70% aqueous nitric acid is uniformly added over 7 minutes to adjust the pH to 2–3. The mixture is then stirred at 25°–30° C. until a urea-formaldehyde-methanol polymer is formed which when stripped of the volatiles present is soluble in all proportions in water and dissolves at least 50% of its weight of toluene at 25° C. This is regarded as the end point of the reaction. About 1 hour is generally required. The mixture is then adjusted to pH 7–8 with 50% aquous sodium hydroxide solution and subjected to distillation under reduced pressure to strip off substantially all of the volatiles present. The terminal temperature of the stripping step is about 100° C. The syrup has a Gardner-Holdt viscosity of $Z_5$ at 25° C.

The syrup dissolves rapidly and completely at 25° C. in all proportions in water and in butanol, dissolves to the extent of at least 50% by weight in a 50:50 butanol: xylene mixture, and is compatible to the extent of 5% to 50% by weight with short oil thermosetting alkyd resins. Coatings of the resulting mixtures rapidly convert to hard and glossy films when baked for 1 hour at 105° C. They thermoset in a few minutes at that temperature when admixed with an acid catalyst.

The syrup is stable for more than 6 months at room temperature.

The syrup is diluted to 80% solids with isopropyl alcohol, cooled to room temperature, and filtered to remove insolubles (largely formate and nitrate salts).

EXAMPLE 2

The following illustrates the formation of an aqueous coating composition containing the resinous product of the process of the present invention.

An aqueous coating composition is prepared by milling 200 g. of OR–600 grade rutile titanium dioxide pigment (titanium dioxide pigment carrying a hydrous metal oxide coating) into 123.1 g. of a 65% by weight solution of a thermosetting water-soluble alkyd resin in 4:1 isobutyl alcohol:water mixture. There is then added 165.4 g. more of the alkyd resin solution, 78.1 g. of the 80% resin solution of Example 1, 20.0 g. of 28% ammonia, and 163.4 g. of water, and milling is continued until a homogeneous slurry is obtained. The product is a bake-type enamel which produces a hard adherent film on primed steel when baked for 15 minutes at 300° F.

EXAMPLE 3

The following illustrates the formation of an organic (anhydrous) coating composition containing the resin product of the present application.

To 186.3 g. of a 55% by weight solution in xylene of a thermosetting short oil alkyd resin (composed of 41% phthalic anhydride, 33% soya acids and 26% glycols, having an acid number of 6–12) is added 307.4 g. of the titanium dioxide pigment of Example 2 and the mixture is milled. There is then added 280.8 g. more of the alkyd resin solution, 107.0 g. of the resin syrup of Example 1 (containing 20% isopropyl alcohol), 87.3 g. of xylene, and 31.2 g. of butanol. The mixture is milled until homogeneous. The product is an enamel which forms a hard glossy film when baked on primed steel for 30 minutes at 250° F.

EXAMPLE 4

The procedure of Example 1 is repeated except that the methanol is replaced by molar equivalent amounts of ethanol. A similar resin is obtained having a Gardner-Holdt viscosity of $Z_6$ at 25° C.

EXAMPLE 5

The following illustrates the manufacture of a stable, water- and butanol-soluble methylated urea-formaldehyde resin according to the present invention using aqueous formaldehyde in place of paraformaldehyde.

To a two-liter three-necked flask equipped with stirrer, condenser and thermometer is charged 614 g. of 44% aqueous formaldehyde (9 mols) and a sufficient amount of triethanolamine to adjust the pH to 7.5. The temperature is raised to 50° C., 180 g. (3 mols) of urea is added over 20 minutes, and the mixture is heated at 80° C. until the mixture is clear and homogeneous (25–30 minutes). The mixture is then distilled under vacuum until 85% of the water (ca. 300 g.) has evolved. To the residual syrup is added 320 g. (10 mols of methanol and, over seven minutes, enough 90% aqueous formic acid to decrease the pH to 4.5–5.5. The mixture is then brought to reflux (about 84° C.) and refluxing is continued until the rate of reaction of the methanol with the urea-formaldehyde reaction product has become negligibly slow (about 3 hours). The pH of the mixture is adjusted to between 2 and 3 and the mixture is stirred at 25°–30° C. to the end point described in Example 1. About 1 hour is generally required. The mixture is then adjusted to pH 7–8 with 50% aqueous sodium hydroxide solution and is stripped under reduced pressure to remove substantially all of the volatiles present. The terminal temperature of the stripping step is about 100° C. The syrup is substantially the same as the syrup of Example 1.

EXAMPLE 6

The following illustrates the preparation of a resin according to the present invention carrying butoxy substituents.

The procedure of Example 5 is repeated except that the amount of methanol is decreased to 288 g. (9 mols); at the end of first acid reflux the reaction mixture is neutralized and substantially all the water and excess methanol are distilled off; 1.5 mols (111 g.) of n-butanol are added at the start of the second acid reaction; and nitric acid is used to adjust the pH to 2 to 3. The reaction is stopped at the end point of Example 1.

The resin is similar to the product of Example 5, but possesses better solubility in xylene. It contains methoxymethyl and n-butoxymethyl substituents in about 4:1 molar ratio.

EXAMPLE 7

The following illustrates the preparation of a resin syrup according to the present invention wherein a larger amount of methanol is combined resulting in the formation of a resin which possesses a lower viscosity and better solubility in toluene while being soluble in all proportions in water, and which is sufficiently fluid to be added directly to surface coating formulations without need for dilution with a solvent.

The procedure of Example 5 is repeated except that at the end of the first acid reflux the pH is adjusted to 7–8 with 50% sodium hydroxide solution and the water and unreacted methanol and formaldehyde are removed by vacuum distillation. To the clear syrup is then added 192 g. (6.0 mols) of fresh methanol followed by the addition of enough nitric acid to lower the pH at 30° C. to 2–3. The mixture is held for 30 minutes at 35–40° C. and is then neutralized to pH 7.5–8.0 by the addition of 50% sodium hydroxide solution. The water and unreacted methanol present are removed under vacuum and the syrup is concentrated to a terminal temperature of 90° C. A slightly hazy syrup of $Z_2$ viscosity is obtained which is clarified by filtration. The syrup is soluble in all proportions in water and dissolves at least 65% of its weight of toluene.

EXAMPLE 8

The following illustrates the preparation of a water- and toluene-soluble resin according to the present invention which has a reacted content of a substantially water-insoluble alcohol.

The procedure of Example 6 is repeated except that the butanol is replaced by 1.0 mol (102 g.) of 1-hexanol and nitric acid is employed for the adjustment of pH to 2 to 3.

The reaction is stopped at the end point of Example 1.

The resin is similar to the product of Example 5 but possesses better solubility in xylene.

We claim:

1. A substantially anhydrous water-soluble thermosetting stable methylated urea-formaldehyde resin wherein the weight of the methoxyl substituents therein is between 28% and 40% of the weight of the resin and the molar ratio of the reacted formaldehyde in said resin to said methoxyl substituents is such that in the absence of organic solvent the resin at 25° C. is soluble to the extent of at least 50% by weight in water and dissolves at least 50% of its weight of toluene, the polymeric form of said resin being not substantially in excess of tetrameric, the molar ratio of reacted urea to reacted formaldehyde in said resin and the molar ratio of reacted formaldehyde to reacted methanol therein being within the ranges:

| Ranges | Molar ratio | | | | |
|---|---|---|---|---|---|
| | Urea | :CH$_2$O | :CH$_3$OH | CH$_2$O | :CH$_3$OH |
| Lower | 1 | 2.2 | 1.3 | 1 | 1.10 |
| Upper | 1 | 2.8 | 2.0 | 1 | 2.15 | said resin consisting essentially of

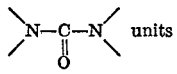 units

CH$_2$— bridges between said units, and H, —CH$_2$OH and —CH$_2$OCH$_3$ substituents.

2. A resin according to claim 1 wherein the molar content of reacted urea, formaldehyde and methanol and the molar ratio of reacted formaldehyde to methanol in the resin is within the range:

| | | |
|---|---|---|
| Urea | mol | 1 |
| CH$_2$O | mols | 2.4 |
| CH$_3$OH | do | 1.5 |
| CH$_2$O:CH$_3$OH | molar ratio | 1.60 |

3. A resin according to claim 1 substantially in the dimeric-tetrameric range.

4. A resin according to claim 1 containing up to about 0.5 mol of C$_2$–C$_6$ alkoxy substituents per urea residue therein.

5. A resin according to claim 4 wherein the alkoxy substituents are n-butoxy substituents.

6. In the manufacture of a substantially anhydrous water-soluble thermosetting stable methylated urea-formaldehyde resin by a process wherein a starting mixture of 1 mol of urea, 2 to 4 mols of formaldehyde, and 2 to 6 mols of methanol is refluxed at an alkaline pH until sufficient of said formaldehyde has reacted with said urea to form a water-soluble methylolurea and said mixture is refluxed at an acid pH until sufficient of said methanol has reacted with said methylolurea to form a urea-formaldehyde resin which contains at least one methoxymethyl substituent per urea residue, the improvements which comprise: performing said alkaline reflux at pH 7.5–11.5 until said mixture is clear and homogeneous; performing said acid reflux in the substantial absence of water at pH 4.5–5.5 until the rate at which said methanol reacts with said methylolurea has become negligibly slow; adjusting the pH of the mixture from said acid reflux to 2 to 3 and maintaining said mixture at 20° C. to 40° C. until the mixture is soluble in butanol at 25° C.; and adjusting the pH of the mixture to 7–10 and distilling off substantially all water present, whereby a methylated urea-formaldehyde resin is formed which is soluble at 25° C. to the extent of at least 50% weight in water, which dissolves at least 50% of its weight of toluene, and which has a content of methoxyl substituents between 28% and 40% of the weight of said resin, the polymeric form of said resin being not substantially in excess of tetrameric.

7. A process according to claim 6 wherein the urea:formaldehyde:methanol molar ratio in the starting mixture is 1:3:3.

8. A process according to claim 6 wherein the alkaline reflux is performed at pH 9–10.

9. A process according to claim 6 wherein the pH reduction to 4.5–5.5 is effected by addition of formic acid.

10. A process according to claim 6 wherein at the end of the first acid reflux the water and unreacted methanol therein are removed by distillation, and prior to the start of the second acid reaction up to 0.5 mol of a water-soluble C$_2$–C$_6$ alkanol is added per mol of urea in the starting mixture.

11. A process according to claim 10 wherein the C$_2$–C$_6$ alkanol is n-butanol.

12. A process according to claim 6 wherein the pH reduction to 2–3 is effected by addition of nitric acid.

13. A process according to claim 6 wherein, at the completion of said acid reflux at pH 4.5–5.5 when the rate at which the methanol reacts with the methylurea has become negligibly slow, substantially all water and free methanol in the reaction mixture are distilled off, and the methanol which is distilled off is replaced by a substantially equal amount of methanol.

References Cited

UNITED STATES PATENTS

| | | | |
|---|---|---|---|
| 2,191,957 | 2/1940 | Edgar et al. | 260—70 |
| 2,334,097 | 11/1943 | Howald et al. | 260—70 X |
| 2,377,422 | 6/1945 | Hopgins et al. | 260—70 |
| 2,447,621 | 8/1948 | Smidth | 260—70 X |
| 2,645,625 | 7/1953 | Bonzagni | 260—70 X |
| 2,693,460 | 11/1954 | Gagliardi | 260—70 |
| 2,670,341 | 2/1954 | Joffe | 260—70 |
| 2,750,356 | 6/1956 | Hurwitz | 260—70 |
| 2,859,206 | 11/1958 | Polansky et al. | 260—70 |
| 3,059,027 | 10/1962 | Clemens et al. | 260—70 X |

FOREIGN PATENTS

| | | | |
|---|---|---|---|
| 521,380 | 5/1940 | Great Britain | 260—70 A |
| 630,712 | 11/1961 | Canada | 260—70 A |

HOWARD E. SCHAIN, Primary Examiner

U.S. Cl. X.R.

117—128.4, 161 LN; 260—29.4 R, 33.4 R, 33.6 R, 850

UNITED STATES PATENT OFFICE
CERTIFICATE OF CORRECTION

Patent No. 3,803,095          Dated April 9, 1974

Inventor(s) LEONARD JOSEPH CALBO, Jr., and JERRY NORMAN KORAL

It is certified that error appears in the above-identified patent and that said Letters Patent are hereby corrected as shown below:

Column 2, line 21: After "—CH$_2$OH," add -- and --.
Column 6 line 69: After "units" add -- , --; Column 6 line 70: Change "CH$_2$—" to -- —CH$_2$— --; change "H," to -- —H, --.

Signed and sealed this 8th day of October 1974.

(SEAL)
Attest:

McCOY M. GIBSON JR.          C. MARSHALL DANN
Attesting Officer             Commissioner of Patents

UNITED STATES PATENT OFFICE
CERTIFICATE OF CORRECTION

Patent No. 3,803,095　　　　　　Dated April 9, 1974

Inventor(s) LEONARD JOSEPH CALBO, Jr. et al.

It is certified that error appears in the above-identified patent and that said Letters Patent are hereby corrected as shown below:

In Claim 1, cancel the table and replace by the following:

| Ranges | Molar Ratio Urea : $CH_2O$ : $CH_3OH$ | | | Molar Ratio $CH_2O$ : $CH_3OH$ |
|---|---|---|---|---|
| Lower | 1 | 2.2 | 1.3 | 1.10 |
| Upper | 1 | 2.8 | 2.0 | 2.15 |

Signed and sealed this 24th day of December 1974.

(SEAL)
Attest:

McCOY M. GIBSON JR.
Attesting Officer

C. MARSHALL DANN
Commissioner of Patents